United States Patent
Tanaka et al.

[11] Patent Number: 5,315,609
[45] Date of Patent: May 24, 1994

[54] SEMICONDUCTOR LASER MODULE WITH LENS HOLDER COMPENSATING FOR THERMAL STRESS

[75] Inventors: Tsuyoshi Tanaka, Yokohama; Satoshi Aoki, Chigasaki; Kazuyuki Fukuda, Ibaraki, all of Japan

[73] Assignee: Hitachi, Ltd., Tokyo, Japan

[21] Appl. No.: 968,668

[22] Filed: Oct. 30, 1992

[30] Foreign Application Priority Data

Oct. 30, 1991 [JP] Japan ................... 3-310195

[51] Int. Cl.$^5$ ............... H01S 3/18; G02B 6/26
[52] U.S. Cl. ................ 372/43; 372/34; 372/33; 385/34; 385/92; 385/93
[58] Field of Search ............ 385/92, 93, 94, 88, 385/90, 84, 78, 74, 66, 34, 51, 52; 372/43, 34, 36, 33, 7, 44, 50, 108, 101

[56] References Cited

U.S. PATENT DOCUMENTS

| | | | |
|---|---|---|---|
| 4,834,491 | 5/1989 | Aoki et al. | 372/43 X |
| 4,927,228 | 5/1990 | Van De Pas | 385/90 X |
| 5,029,968 | 7/1991 | Geiser, Jr. et al. | 385/88 X |
| 5,046,798 | 9/1991 | Yagiu et al. | 385/34 |
| 5,073,047 | 12/1991 | Suzuki et al. | 385/93 |
| 5,119,462 | 6/1992 | Matsubara et al. | 385/34 X |
| 5,127,074 | 6/1992 | Watanabe et al. | 385/34 X |
| 5,150,230 | 9/1992 | Masuko et al. | 385/34 X |
| 5,195,155 | 3/1993 | Shimaoka et al. | 385/90 |
| 5,212,699 | 5/1993 | Masuko et al. | 372/34 |
| 5,253,260 | 10/1993 | Palombo | 372/43 |

FOREIGN PATENT DOCUMENTS

| | | | |
|---|---|---|---|
| 2652165 | 9/1989 | France | 385/88 X |
| 3-155509 | 3/1991 | Japan | 385/34 X |

OTHER PUBLICATIONS

Patent Abstracts of Japan—Publication No. JP3068906, Publication Date Mar. 25, 1991—Inada Katsumi, et al.
Patent Abstracts of Japan—Publication No. JP3155509, Publication Date Jul. 3, 1991—Ito Masataka.

*Primary Examiner*—Brian Healy
*Attorney, Agent, or Firm*—Antonelli, Terry, Stout & Kraus

[57] ABSTRACT

A semiconductor laser module is provided by silver soldering the holder part of Kovar to the package of Kovar, and then silver soldering the lens holder part of pure iron or a stainless steel to the holder part. The lens holder part has the convergent rod lens fixedly soldered thereto by an Au/Sn solder of a high melting point of 280° C. The semiconductor laser is fixedly soldered onto a stem, with the stem, the optical fiber and ferrule holder being fixedly soldered at positions so that the light emitted from the semiconductor laser is converged by the convergent rod lens at the light incidence end of the optical fiber and the laser light is coupled to the optical fiber. Thus, the convergent rod lens can be fixed with high-melting-point joining means, and a semiconductor laser module for optical communications in which the deterioration of light connection repeatedly generated by heat stress is suppressed can be obtained.

5 Claims, 4 Drawing Sheets

SEMICONDUCTOR LASER MODULE WITH LENS HOLDER COMPENSATING FOR THERMAL STRESS

BACKGROUND OF THE INVENTION

This invention relates to a semiconductor laser module, and, more particularly, to a semiconductor laser module for optical communications over a wide range of working temperature.

A semiconductor laser module for optical communications is proposed in JP-A-Hei- 3-155509 which, as shown in FIG. 1, comprises an optical device including an optical transmitter or detector mounted in a package 1, and an optical fiber 3 having one end face end faces located at an image-forming position 2a of a lens 2 and protected by a cylindrical ferrule fixed to the package 1 through a ring fitted over the lens 2 disposed in front of the optical device, wherein the end face of said optical fiber 3, directed to the optical device, is arranged so as to be substantially in the same plane as a joint plane of the lens-engaging ring and the package 1, and wherein a lens holder 4, made of a metal rod for holding the lens 2, is a monolithic body formed by a single material. In FIG. 1, reference numeral 5 denotes a heat sink and reference numeral 6 denotes a semiconductor laser.

As mentioned above, the lens holding member constituted by the lens holder 4 for holding the lens 2 and mounted in the package 1 as a component part of the semiconductor laser module is monolithic and made by a material of one kind.

However, since the material for the package main body 1, Kovar (KV), nickel alloy, etc. have been used to form air-tight terminals, consideration of a thermal expansion coefficient relationship with a glass or ceramic as an air-tight sealing material must be given consideration.

In the prior art, relative to the package 1, it is necessary to mechanically stably fix the lens holder member 4, made of a metal rod, for holding the lens 2 when the lens holder is connected to the package 1. Therefore, for the lens holder member 4, a material with a thermal expansion coefficient equivalent to the material of the package is used. So, a difference arises between the thermal expansion coefficient of the lens holder 4 and that of the lens 2. In the above-mentioned prior art, however, because a solder with a melting point of 200° C. or below is used as a fixing material for fixing the lens 2, the above problem attributable to a difference in the thermal expansion coefficient has not occurred.

Yet, in the prior art, if an attempt is made to fix the lens 2 with joining means having a high melting point of 280° C. or higher, cracks occur in the lens 2 caused by thermal stress; therefore, it is impossible to fix the lens with high-melting-point joining means.

In recent years, the working temperature range required of the semiconductor laser modules for optical communications has been expanded to a wider range of −40° C. to +85° C. instead of the conventional range of 0° C. to +65° C.

With the above-mentioned prior art, it is impossible to fix the lens 2 with high-melting-point joining means, which assures high reliability in the required range of working temperature, and thus, the problem with the prior art is that it does not have sufficient reliability against changes in the thermal environment.

SUMMARY OF THE INVENTION

A main object of the present invention is to provide a semiconductor laser module for optical communications which solves the above-mentioned problem of the prior art, which permits a lens to be fixed with high-melting-point joining means, and which can operate with high reliability in a wide range of working temperature.

Another object of the present invention is to reduce the repeated heat stress and abate the fatigue deterioration of the joints of parts.

According to the present invention, the above objects can be achieved by dividing the lens holder member, mounted in the package of the semiconductor laser module, into two separate parts, that is, a package connection part and a lens connection part, and by using materials whose thermal expansion coefficients approximate to those of the package and the lens, respectively. And, for fixing the lens, an Au/Sn solder with a high melting point of 280° C. was used.

By the above arrangement, the lens can be fixed with a high-melting-point solder without losing the reliability of the package connection part, and the fatigue deterioration of the solder at the lens connection part caused by repeated thermal stress can be abated, thereby improving the reliability of the lens connection part.

Fixing the lens with joining means such as a solder with a high melting point of 280° C. or higher is possible by forming the lens holder member mounted in the package in a two-piece structure, and adopting the same material as the package material for the package connection part and a material whose thermal expansion coefficient approximate to that of the lens for the lens connection part. By fixing the lens with high-melting-point joining means such as this, the fatigue deterioration of the lens fixing part can be restrained which is one factor causing the deterioration of the coupling of light caused by changes in the thermal environment, so that the reliability of the semiconductor laser module can be improved to provide against the thermal environment changes.

BRIEF DESCRIPTION OF THE DRAWINGS

A preferred embodiment of the present invention will now be described in conjunction with the accompanying drawings, wherein:

FIGS. 3A and 3B are graphical illustration of calculation results of the stress distribution in the surface of the lens fixed by an Au/Sn solder in which FIG. 3A shows the stress in the Y-direction and FIG. 3B shows the stress in the Z-direction; and FIGS. 4A and 4B graphical illustration of calculation results related to the thermal expansion coefficient difference and the lens stress, in which FIG. 4A shows the calculation results in the Y-direction and FIG. 4B shows the calculation results in the Z-direction.

DESCRIPTION OF THE PREFERRED EMBODIMENT

An embodiment of the semiconductor laser module according to the present invention will be described in detail referring to the accompanying drawings.

Figure 2:
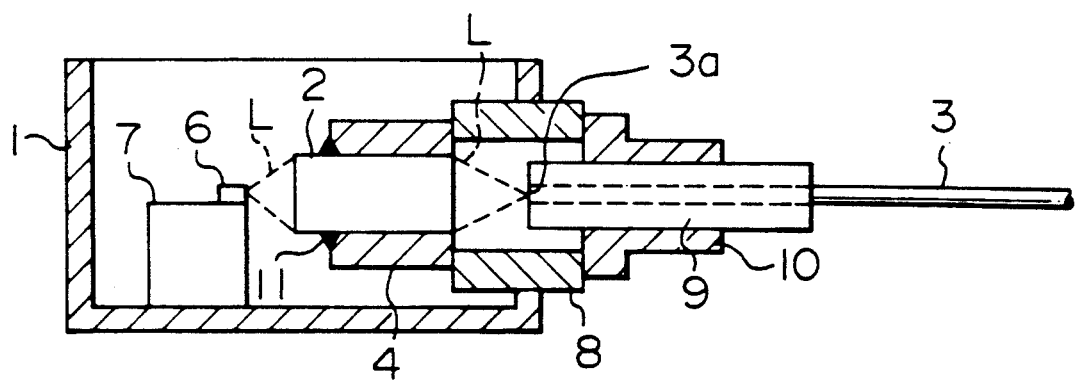
FIG. 2 is a longitudinal sectional view of an embodiment of a semiconductor laser module according to the present invention.
Figure 2:
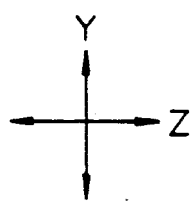

Referring now to the drawings wherein like reference numerals are used throughout the various views to designate like parts and, more particularly, to FIG. 2, according to this figure, a semiconductor laser model according to the present invention includes a package 1, a convergent rod lens 2, an optical fiber 3, a lens holder 4, a semiconductor laser 6, a stem 7, a holder 8, a ferrule 9, a ferrule holder 10, and a high-melting-point solder 11.

As shown in FIG. 2, the semiconductor laser module 10 is formed by silver soldering the holder 8 of Kovar to the package 1 also of Kovar, and then by silver soldering the lens holder 4 made of pure iron to the holder 8. The lens holder 4 has the convergent rod lens 2 fixed thereto by soldering with an Au/Sn solder having a melting point of, for example, 280° C.

The semiconductor laser 6 is fixed onto the stem 7 by soldering, with the stem 7, the optical fiber 3 and the ferrule holder 10 being fixed by soldering at positions so that the light L emitted from the semiconductor laser 6 is converged by a convergent rod lens 2 at the light incidence end 3a of the optical fiber 3 and the laser light is coupled to the optical fiber.

Figure 1:
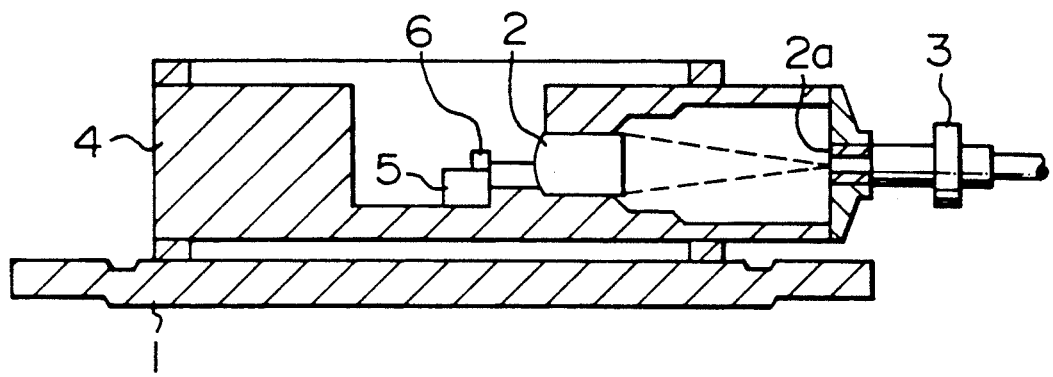
FIG. 1 is a sectional view of a semiconductor laser module according to the prior art.

The most conspicuous differences from the prior art in the embodiment of the present invention constructed as described resides in the fact that in the prior art, the lens holder 4 as shown in FIG. 1, is a single or monolithic body fashioned of Kovar, the same material as that of the package 1, whereas, in this embodiment of the present invention, the holder 8 and the lens holder 4 are provided separately and pure iron with a thermal expansion coefficient of $10 \times 10^{-6}/°C$. very close to that of the convergent rod lens 2 is used as the material of the lens holder 4 serving as the part for fixing the lens.

The thermal expansion coefficient of Kovar alloy is $5.7 \times 10^{-6}/°C$., and that of the lens 2 is $11 \times 10^{-6}/°C$. Therefore, in the above-mentioned prior art, with the difference in the thermal expansion coefficient being excessive between the Kovar-made lens holder and the lens itself, so that if the lens is fixed by a high-melting-point solder such as an Au/Sn solder, cracks occur in the lens caused by thermal stress.

As mentioned above, in this embodiment of the present invention, as the material for the lens holder 4 for fixing the lens, pure iron with a thermal expansion coefficient of $10 \times 10^{-6}/°C$. very close to that of the convergent rod lens 2 is used, and, therefore, the thermal stress which occurs between them can be alleviated, so that the lens 2 can be fixed with a high-melting-point solder 11 such as an Au/Sn solder without the occurrence of cracks in the convergent rod lens 2.

As has been discussed above, according to this embodiment of the present invention, by matching the coefficients of thermal expansion between the convergent rod lens 2 and the lens holder 4 and also fixing the lens 2 to the lens holder by using a high-melting-point solder 11 such as an Au/Sn solder, the fatigue deterioration of the joints of parts can be restrained by alleviating the repeated thermal stress. Consequently, the deterioration of coupling of light caused by changes of the thermal environment can be restrained, thereby improving the reliability of the semiconductor laser module.

In addition, the lens holder in the prior art is divided into two parts, and Kovar alloy, used as the material of the package 1 in this invention as in the prior art, is also adopted for the holder 8 joined to the package 1, by which higher reliability is imparted to the semiconductor laser module as it can preserve itself from the fatigue deterioration by the reduced repeated thermal stress between the package 1 and the holder 8.

In the present invention, the lens holder 4 is formed by pure iron, but the lens holder may be formed by other materials with a thermal expansion coefficient close to that of the lens 2, such as stainless steel (SUS430 with thermal expansion coefficient $11.9 \times 10^{-6}/°C$.).

According to the invention, a laser diode has been shown as an optical device to transmit a signal power, but a photodiode may be used to receive the signal power. In FIG. 2, the image forming system has been formed by a single lens, but the image forming system may be formed by two or more lenses.

Figure 3A:
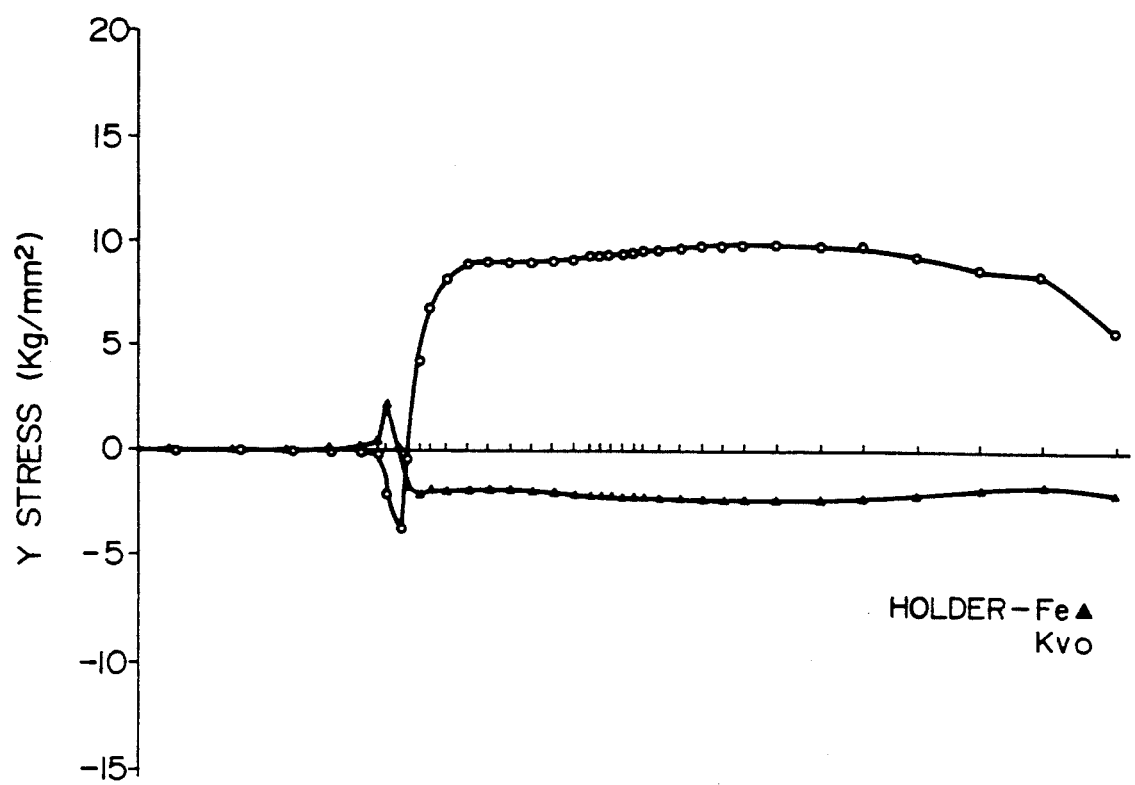
Figure 3B:
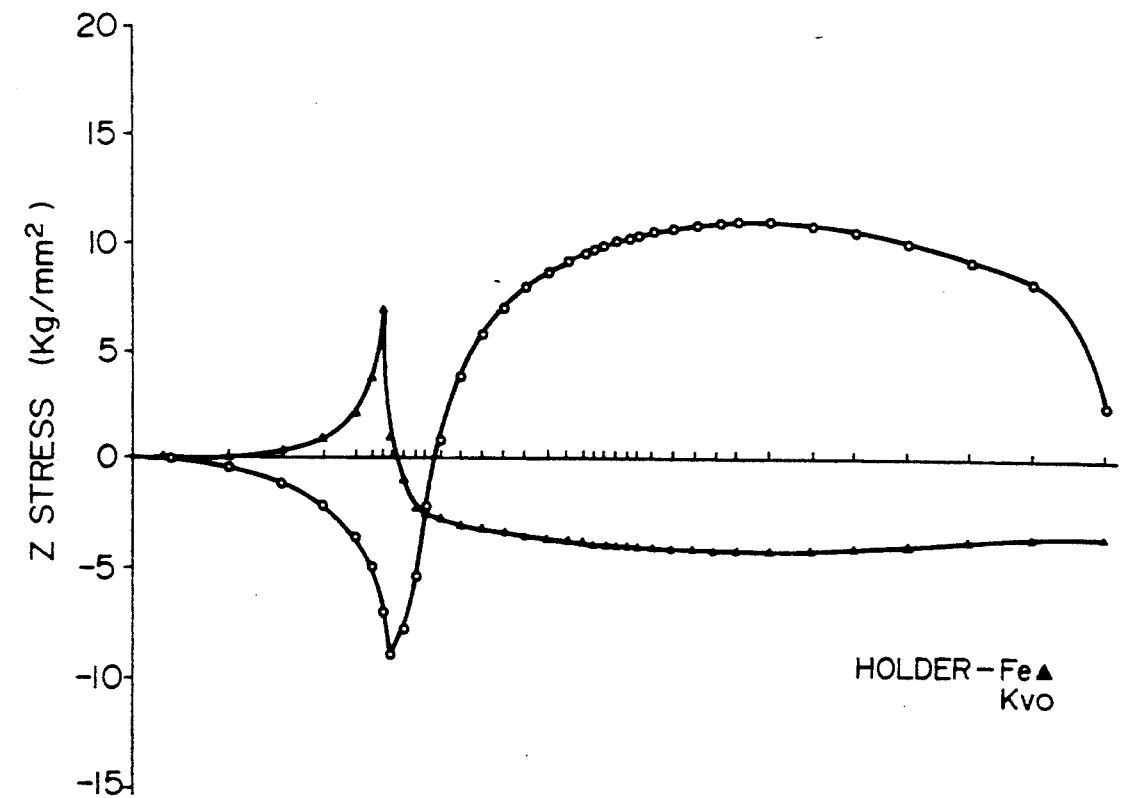

In FIG. 3A, when the lens holder is of Kovar (KV), the stress induced in the Y-direction of the lens 2 is about 10 kg/mm², and when the lens holder is of Fe, that is about 2.5 kg/mm². In FIG. 3B, on the other hand, when the lens holder is of Kovar, the stress induced in the Z-direction of the lens 2 about 11 kg/mm², and when the lens holder is of Fe, that is about 4 kg/mm². The lens holder of Fe which is little different from the lens 2 in terms of the thermal expansion coefficient can be said to be more suitable.

Figure 4A:
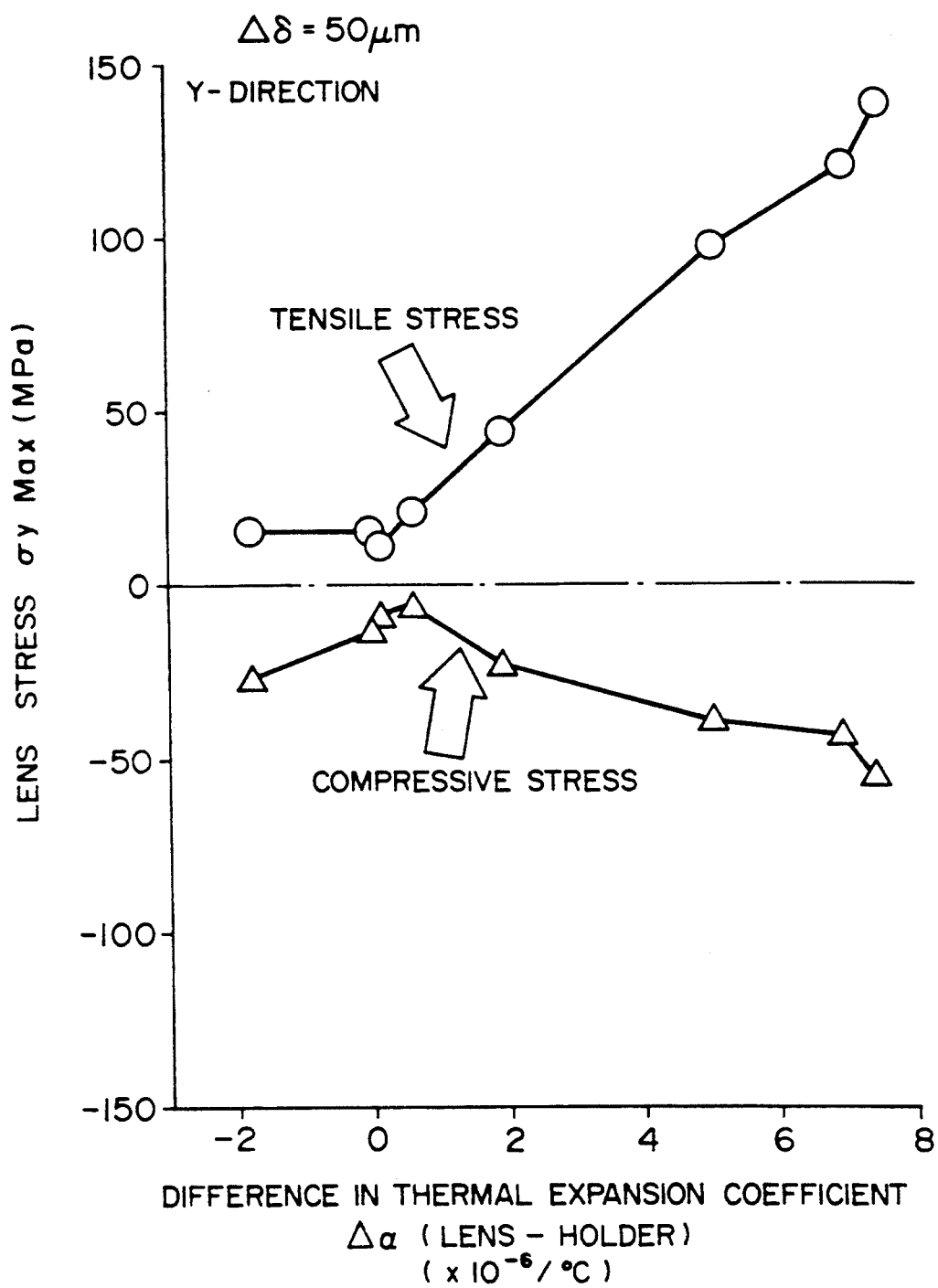
Figure 4B:
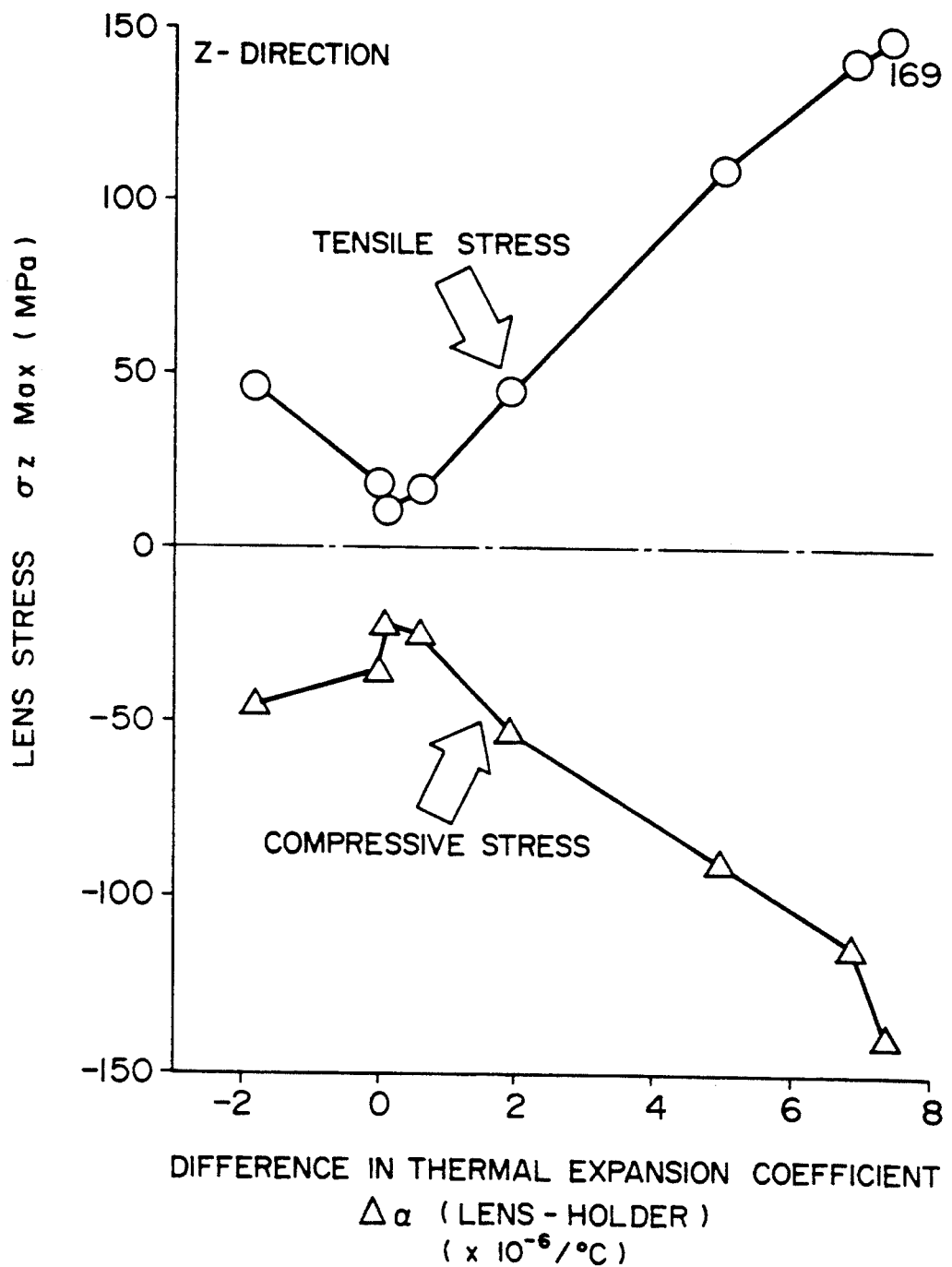

It is understood from FIGS. 4A and 4B that the stress in the surface of the lens is less for smaller differences in the thermal expansion coefficient.

As has been described, according to the present invention, the lens can be fixed with a high-melting-point solder, and at respective joints of parts, the repeated thermal stress can be abated, and the fatigue deterioration can be restrained, so that the reliability of the semiconductor laser module can be improved.

We claim:

1. A semiconductor laser module formed by fixing to a package a holding member for holding a rod lens for converging a laser light from a semiconductor laser, and coupling said laser light to an optical fiber, wherein said holding member is formed in a two-piece structure including a holder part formed as a first material and fixedly soldered to said package and a lens holder part formed of a second material different from said first material, said lens holder part being fixedly soldered to one inner end face of said holder part within said package, an opposite other end face of said holder part having said optical fiber passing therethrough, wherein said second material of said lens holder part has a thermal expansion coefficient near a thermal expansion coefficient of said lens, and wherein said lens holder part is fixedly soldered to said rod lens with a high-melting-point solder.

2. A semiconductor laser module according to claim 1, wherein said lens holder part is made of one of pure iron or a stainless material.

3. A semiconductor laser module according to claim 1, wherein said holder part is formed of the same material as that of said package.

4. A semiconductor laser module according to claim 3, wherein said package and said holder part are made of Kovar.

5. A semiconductor laser module according to claim 1, wherein the soldered connection of said lens holder part to said one inner end face of said holder part is a butt joint between respective ends of said lens holder part and said holder part.

* * * * *